(12) United States Patent
Lindloff

(10) Patent No.: US 11,072,383 B2
(45) Date of Patent: Jul. 27, 2021

(54) MOTORCYCLE PASSENGER FOOTREST MOUNT

(71) Applicant: Ciro, LLC, Hudson, WI (US)

(72) Inventor: Christopher Lindloff, New Richmond, WI (US)

(73) Assignee: CIRO CORPORATION, Hudson, WI (US)

( * ) Notice: Subject to any disclaimer, the term of this patent is extended or adjusted under 35 U.S.C. 154(b) by 209 days.

(21) Appl. No.: 16/521,285

(22) Filed: Jul. 24, 2019

(65) Prior Publication Data

US 2021/0024162 A1    Jan. 28, 2021

(51) Int. Cl.
*B62J 25/00* (2020.01)

(52) U.S. Cl.
CPC ..................... *B62J 25/00* (2013.01)

(58) Field of Classification Search
CPC ........................................................ B62J 25/00
See application file for complete search history.

(56) References Cited

U.S. PATENT DOCUMENTS

| | | | | |
|---|---|---|---|---|
| 6,173,983 B1 * | 1/2001 | Moore | ..................... | B62J 25/00 280/291 |
| 6,719,316 B1 * | 4/2004 | Anthony | .................. | B62J 25/00 280/291 |
| 7,104,157 B1 * | 9/2006 | Hilliard | ..................... | B62J 25/00 280/291 |
| 2007/0278765 A1 * | 12/2007 | Dugan | ..................... | B62J 25/00 280/291 |
| 2009/0285628 A1 * | 11/2009 | John | ........................ | B62J 25/00 403/408.1 |
| 2015/0137479 A1 * | 5/2015 | Gershteyn | ................ | B62J 25/00 280/291 |
| 2015/0217826 A1 * | 8/2015 | Parvey | ..................... | B62J 25/00 280/291 |
| 2016/0375960 A1 * | 12/2016 | Imai | ...................... | B62K 11/04 180/230 |
| 2019/0092415 A1 * | 3/2019 | Campbell | ................ | B62J 25/00 |
| 2021/0024161 A1 * | 1/2021 | May | ......................... | B62J 25/06 |

* cited by examiner

*Primary Examiner* — Tony H Winner
(74) *Attorney, Agent, or Firm* — Dicke, Billig & Czaja, PLLC

(57) ABSTRACT

A footrest mount plate attachable to a swingarm mounting location on a motorcycle frame includes an inner surface protrusion that fits closely within the swingarm mounting bore, and an outer surface configured for attaching a footrest assembly.

6 Claims, 3 Drawing Sheets

MOTORCYCLE PASSENGER FOOTREST MOUNT

BACKGROUND

Motorcycles such as the Honda Goldwing include a cover secured to the motorcycle frame to hide a portion of the motorcycle frame where the swingarm attaches, which corresponds to the passenger seating area of the motorcycle. A footrest in this location would be beneficial for passengers.

DETAILED DESCRIPTION

Figure 1:
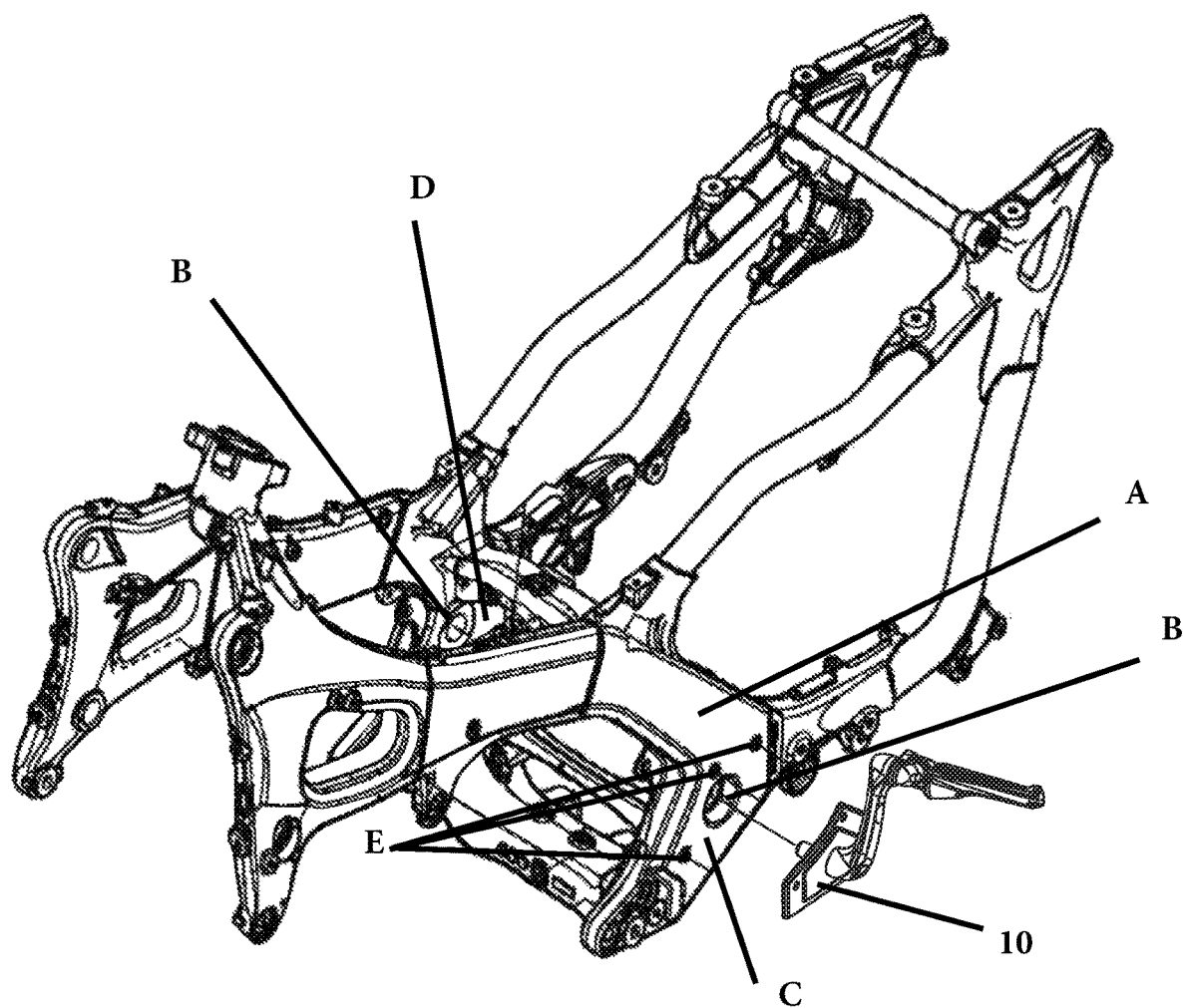
FIG. 1 is an exploded perspective view of a motorcycle frame and a mounting plate for connecting and supporting a footrest assembly.

As shown in FIG. 1, the frame A of a Honda Goldwing motorcycle includes cylindrical bores B on opposite sides of the frame A oriented generally transverse to the long axis of the motorcycle frame for pivotally mounting a swingarm (not shown). Each bore B has a length and extends from the outer surface C of the frame to an inner surface D of the frame A. Each bore B has a stepped inner diameter, with the inner diameter of the bore portion adjacent to the outer surface C of the frame A being greater than the bore portion adjacent to the inner frame surface D. By way of example, the bore portion adjacent to the inner frame surface D can have an inner diameter of between about 0.625 inches and about 0.750. An OEM cover is typically mounted to the outer surface C of the frame via threaded holes E on each side of the frame A to hide the respective bores B.

Figure 2:
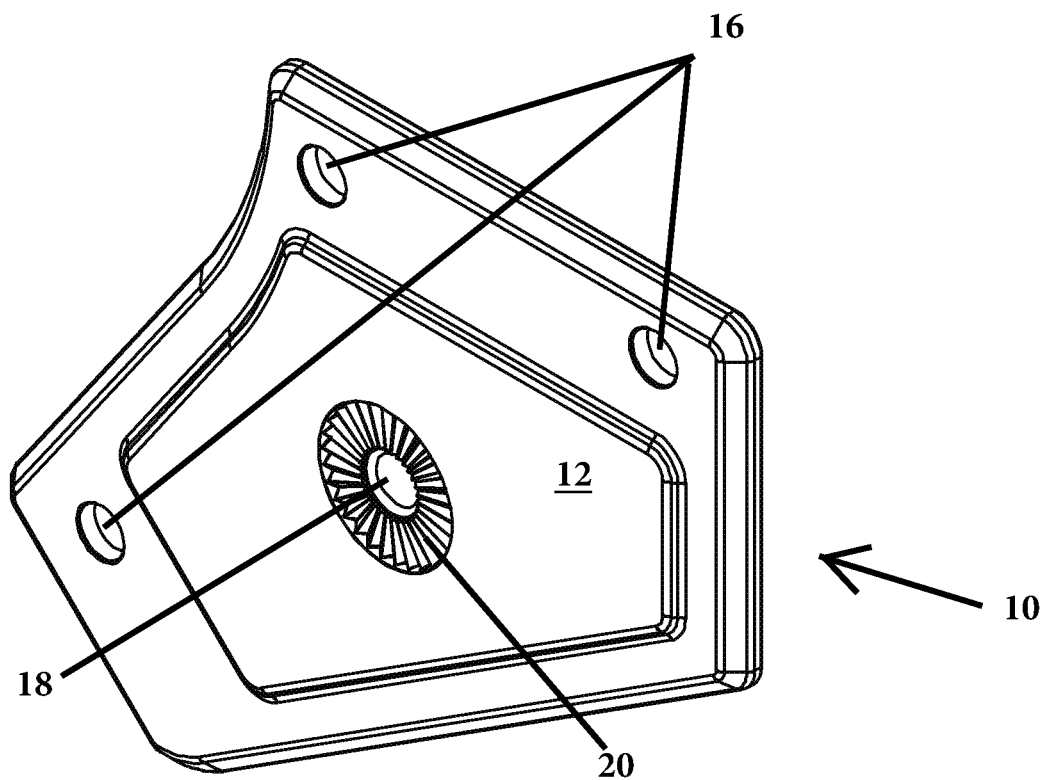
FIG. 2 is a front perspective view of a passenger footrest mounting plate of FIG. 1.

As shown in FIG. 1, A passenger footrest mount plate 10 is configured to replace the OEM swingarm cover. FIG. 2 is a front perspective view of mount plate 10. Mount plate 10 comprises a generally planar metal plate having an outer surface 12 and an inner surface 14 (FIG. 3) and a plurality of through-holes 16 near the periphery for connecting the mount plate 10 to internally threaded holes E in the motorcycle frame A (FIG. 1) with threaded connectors (e.g., screws). Mount plate 10 further includes a generally centrally-located through-hole 18. A portion of the outer surface 12 concentrically surrounding the through-hole 18 is configured with a splined pattern 20. The through-hole 18 and splined outer surface 20 allow for adjustable attachment of a footrest assembly, such as a footrest mounting arm and footpeg (FIG. 1).

Figure 3:
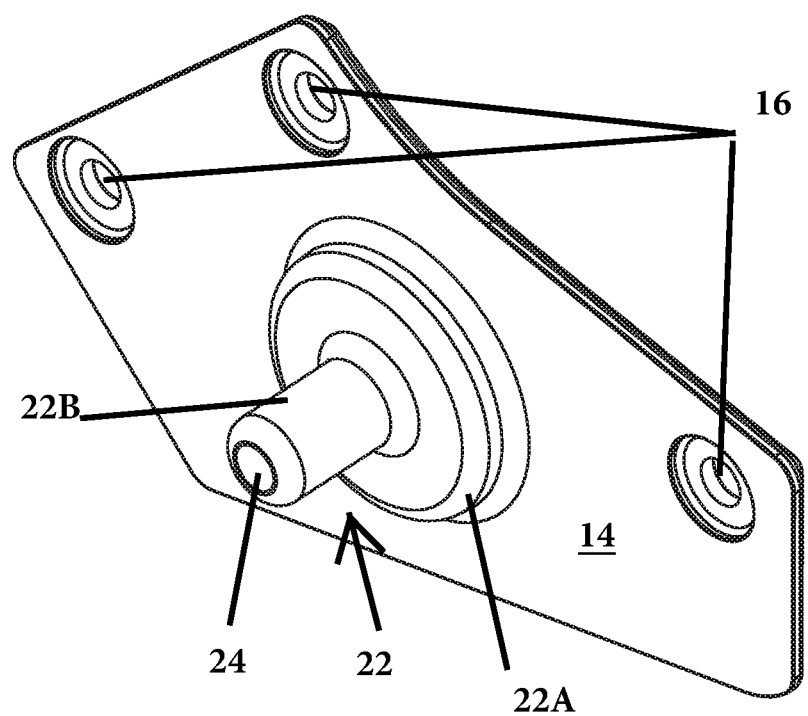
FIG. 3 is a rear perspective view of the mounting plate of FIG. 1.

FIG. 3 is a rear perspective view of mount 10. As shown in FIG. 3, in one embodiment the inner surface 14 of mount plate 10 includes a cylindrical protrusion 22 extending generally normal to the inner surface 14 and coaxially aligned with the centrally located through-hole 18. In one embodiment, the cylindrical protrusion 22 has a stepped outer diameter, with the portion 22A of the protrusion adjacent to the inner surface 14 being greater than that of the remaining portion 22B of the protrusion 22. The configuration and outer diameter of the protrusion portion 22B is selected to mate closely with a corresponding portion of the cylindrical swingarm bore B when mount plate 10 is connected to the motorcycle frame A. Protrusion portion 22A is not critical to the mating function of protrusion 22 within swingarm bore B and in alternative embodiments can be eliminated. Protrusion 22 includes an internally threaded bore 24 that is axially aligned and in communication with the central through-hole 18 for receiving a threaded connector to attach a footrest assembly to mount plate 10. In one embodiment, protrusion 22 is integrally formed with mount plate 10. In an alternative embodiment, protrusion 22 is connect to mount 10 via a threaded connector that connects a footrest assembly to mount 10. In one exemplary embodiment, protrusion 22 has a length of about 1.25 inches, although in alternative embodiments, protrusion 22 can have a length equal to or greater than the outer diameter of the protrusion. In one embodiment, mount plate 10 is formed from cast aluminum.

Mount plate 10 provides a secure footrest mounting location for a Honda Goldwing motorcycle via mounting holes E provided in the frame A for the OEM swingarm cover. The protrusion 22 fitment within the swingarm bore B of the motorcycle frame A provides additional resistance to forces applied to a footrest mounted to mount plate 10 when a passenger rests his or her foot on the footrest.

Although the mounting arm has been described with reference to preferred embodiments, workers skilled in the art will recognize that changes can be made in form and detail without departing from the spirit and scope of the disclosed mounting arm. Applicant intends that the examples described above do not limit the scope of application's invention, which is defined by the claims below. Applicant's descriptions are not intended to redefine the terms set forth in the claims unless applicant has expressly stated that a term means something different than the plain import of the terms.

What is claimed is:

1. A motorcycle footrest mount for connection to a motorcycle frame adjacent a swingarm mounting bore, the footrest mount comprising:
   a metal plate having a first side and a second side and a plurality of through-holes adjacent to a perimeter of the plate, the second side capable of contacting the frame, the plate further having a generally centrally located through-hole relative to the perimeter of the plate;
   a cylindrical protrusion connected to the second side of the plate and having an internally threaded bore therethrough, the bore being coaxial and in communication with the centrally located through-hole;
   wherein the plurality of through-holes are located to mate with internally threaded bores on the motorcycle frame, and wherein the cylindrical protrusion is configured to mate with the swingarm mounting bore when the second side of the plate is in contact with the frame.

2. The motorcycle footrest mount of claim 1, wherein the first side of the metal plate comprises a splined surface portion coaxial with the central through-hole.

3. The motorcycle footrest mount of claim 1, wherein the cylindrical protrusion has an outer diameter of about 0.625 inches to about 0.750 inches.

4. The motorcycle footrest mount of claim 1, wherein the cylindrical protrusion has a first portion adjacent to the second side of the metal plate and a second portion spaced from the second side, the second portion having an outer diameter smaller than the first portion.

5. The motorcycle footrest mount of claim 3, wherein the cylindrical protrusion has a length equal to or greater than the outer diameter.

6. The motorcycle footrest mount of claim 1, wherein the cylindrical protrusion has a length of about 0.625 inches to about 1.25 inches.

* * * * *